United States Patent
Ozawa et al.

(10) Patent No.: US 6,676,283 B2
(45) Date of Patent: Jan. 13, 2004

(54) FRONT END STRUCTURE AND HEADLAMP SYSTEM OF AUTOMOTIVE VEHICLE

(75) Inventors: Ikuo Ozawa, Kariya (JP); Noriaki Maeda, Kariya (JP); Harumi Okai, Kariya (JP); Norihisa Sasano, Kariya (JP); Toshiki Sugiyama, Kariya (JP); Hiroaki Okuchi, Kariya (JP); Yasuhiro Itoh, Kariya (JP); Kazuaki Kafuku, Kariya (JP)

(73) Assignee: Denso Corporation, Kariya (JP)

( * ) Notice: Subject to any disclaimer, the term of this patent is extended or adjusted under 35 U.S.C. 154(b) by 31 days.

(21) Appl. No.: 09/881,236

(22) Filed: Jun. 14, 2001

(65) Prior Publication Data

US 2002/0044455 A1 Apr. 18, 2002

(30) Foreign Application Priority Data

Jun. 14, 2000 (JP) .......................... 2000-178791
Jun. 29, 2000 (JP) .......................... 2000-196967
May 15, 2001 (JP) .......................... 2001-145345

(51) Int. Cl.$^7$ ................................. B60Q 1/00
(52) U.S. Cl. ................ 362/547; 362/294; 362/373; 362/502; 362/276; 362/802

(58) Field of Search .............. 165/42, 44, 43, 165/41, 271; 180/68.2, 271, 282; 362/464, 547, 373, 294, 276, 802, 468, 502; 454/121; 315/82; 340/457.2, 467

(56) References Cited

U.S. PATENT DOCUMENTS 4,435,732 A * 3/1984 Hyatt ..................... 358/254
4,658,595 A * 4/1987 Shimada et al. .......... 62/179

FOREIGN PATENT DOCUMENTS

DE  2613988 A   * 10/1977  ............ B60S/1/54
FR  2698055 A1  * 5/1994   ............ B60Q/1/04
JP  A-6-79008      11/1994

* cited by examiner

Primary Examiner—Stephen Husar
Assistant Examiner—Sharon Payne
(74) Attorney, Agent, or Firm—Harness, Dickey & Pierce, PLC

(57) ABSTRACT

A vent line (440) for establishing communication between the interior of headlamps (500) and at least a blower (300) is formed integrally with a front end panel (400). The vent line (440) makes up a duct member (441) leading from each of the headlamps (500) to the blower (300). A light controller (560) is assembled by being fixed on the panel (400) in such a manner as to be located at the air inlet (442) of the duct member (441) (vent line (440)).

17 Claims, 7 Drawing Sheets

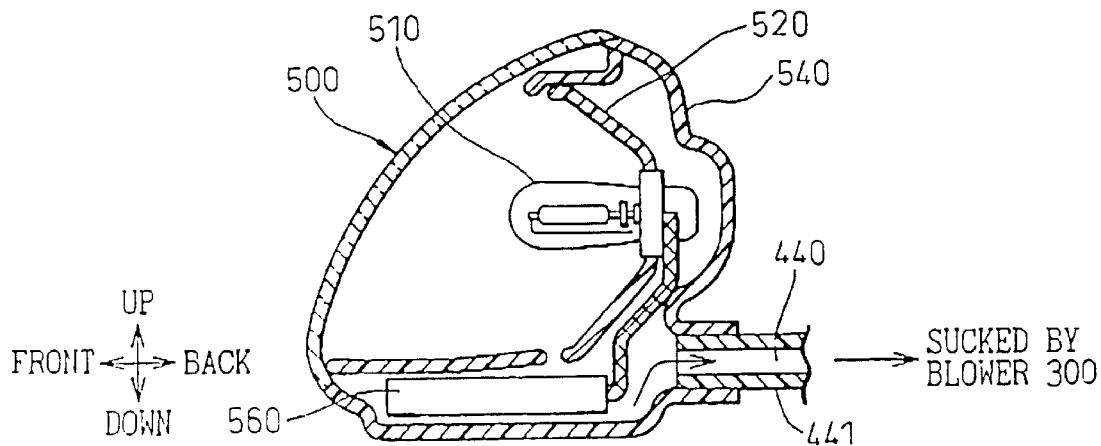
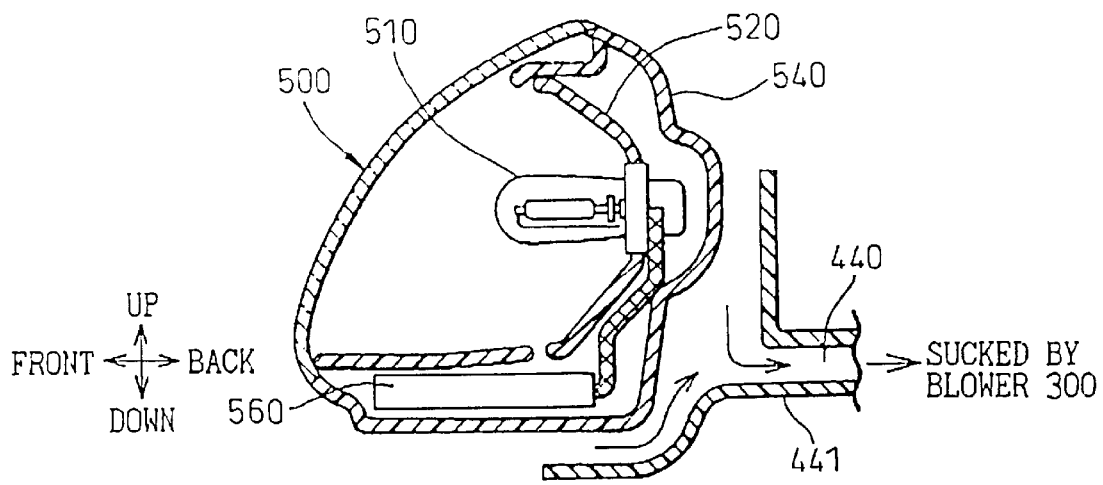

FRONT END STRUCTURE AND HEADLAMP SYSTEM OF AUTOMOTIVE VEHICLE

BACKGROUND OF THE INVENTION

1. Field of the Invention

The present invention relates to a front end structure and a headlamp system of an automotive vehicle.

2. Description of the Related Art

The interior of each headlamp including the headlight for radiating light ahead of a vehicle is not hermetically sealed completely. Therefore, the relative humidity in the headlamp and the relative humidity of the atmosphere are always substantially equal to each other.

On the other hand, the headlamp increases in temperature when turned on. In spite of the fact that the relative humidity in the headlamp and the relative humidity of the atmosphere are substantially equal to each other, therefore, the absolute humidity in the headlamp undesirably increases when it is turned on.

When the headlamp is turned off, the temperature in the headlamp decreases so that the moisture corresponding to the increase of absolute humidity is condensed in the headlamp and dims the headlamp (especially, the lens thereof).

According to the invention described in Japanese Unexamined Utility Model Publication (Kokai) No. 6-79008, the dimming in the headlamp is prevented by forcibly ventilating the interior of the headlamp by a radiator fan. The cited invention, however, creates a problem that the assembly of the headlamp is adversely affected by the fact that the headlamp and the shroud of the radiator fan are connected to each other by a tube to forcibly ventilate the interior of the headlamp.

In order to improve the visibility in the headlamp (500), the heat exchangers (100, 200) and night, on the other hand, an increased number of vehicles have recently been equipped with high intensity discharge lamps (HID) of high brightness.

However, the light controller for the HID lamp, which operates at a high temperature, is required to have a high heat resistance and a superior radiation characteristic.

For this reason, the electric parts such as the IC chip and the base board of the light controller have to be superior in high heat resistance, and therefore it is difficult to reduce the production cost of the light controller.

Also, the need of securing a sufficient radiation capability (radiation area) makes it difficult to reduce the size of the light controller and improve the workability of mounting it on the vehicle.

SUMMARY OF THE INVENTION

In view of the problems described above, an object of the present invention is to improve the assembly workability of the headlamp while at the same time preventing a loss of output thereof.

Another object of the invention is to reduce the production cost and the size of the headlamp control means such as the light controller.

In order to achieve the objects described above, according to a first aspect of the invention, there is provided a front end structure of an automotive vehicle, comprising headlamps (500) for radiating light ahead of the vehicle, heat exchangers (100, 300) arranged on the forward end of the vehicle, at least a blower (300) for blowing the cooling air to the heat exchangers (100, 200), and a front end panel (400) arranged at the front end portion of the vehicle and having assembled thereon the blowers (300), wherein the front end panel (400) is formed with a vent line (440) for establishing communication between the interior of each of the headlamps (500) and each of the blowers (300), and a duct ember (441) constituting the vent line (440) is formed integrally with the front end panel (400).

As a result, upon activation of the blower (300), the interior of the headlamp (500) is forcibly ventilated. Therefore, the absolute humidity in the headlamp (500) becomes substantially equal to the absolute humidity of the atmosphere, and the headlamp (500) can be prevented from becoming dim.

Also, in view of the fact that the duct member (441) making up the vent line (440) is formed integrally with the front panel (400), the assembly of the vent line (440) is completed at the same time as the headlamp (500) is assembled on the front end panel (400).

Therefore, the assembly of the headlamp (500) can be improved, while at the same time preventing the dimming of the headlamp (500), and this reduces the number of steps for assembling the vehicle.

According to another aspect of the invention, there is provided a front end structure of an automotive vehicle, further comprising a blocking member (450) arranged on the side of the headlamp (500) nearer to the heat exchangers (100, 200) for preventing the air that has passed through the heat exchangers (100, 200) from flowing into the headlamp (500).

As a result, the air that has been heated by passing through the heat exchangers (100, 200) can be prevented from flowing into the headlamp (500), and therefore the interior of the headlamp (500) can be rapidly cooled to the same temperature as the atmosphere. Thus, the absolute humidity in the headlamp (500) can be rapidly reduced, and therefore the dimming of the headlamp (500) can be more positively prevented.

According to still another aspect of the invention, there is provided a headlamp system comprising headlamp control means (560) arranged in the vent line (440) for controlling the headlamp (500).

As a result, the headlamp control means (560) can be cooled sufficiently. Therefore, it becomes possible to employ, for the headlamp control means (560), electric parts, such as the IC chip and the base board, having a low heat resistance while at the same time making it possible to reduce the size of the headlamp control means (560). In addition, both the production cost and the size of the headlamp control means (560) can be reduced to improve the workability for mounting the headlamp system on the vehicle.

Incidentally, each of the reference numerals in the parentheses designating the respective means described above is an example indicating the correspondence with the specific means described in the embodiments described below.

The present invention may be more fully understood from the description of the preferred embodiments of the invention set forth below together with the accompanying drawings.

BRIEF DESCRIPTION OF THE DRAWINGS

FIG. 8 is a sectional view taken in line A—A in FIG. 7.

FIG. 9 is a sectional view of the headlamp system according to a sixth embodiment of the invention corresponding to the sectional view taken in line A—A in FIG. 8.

DESCRIPTION OF THE PREFERRED EMBODIMENTS

First Embodiment

Figure 1:
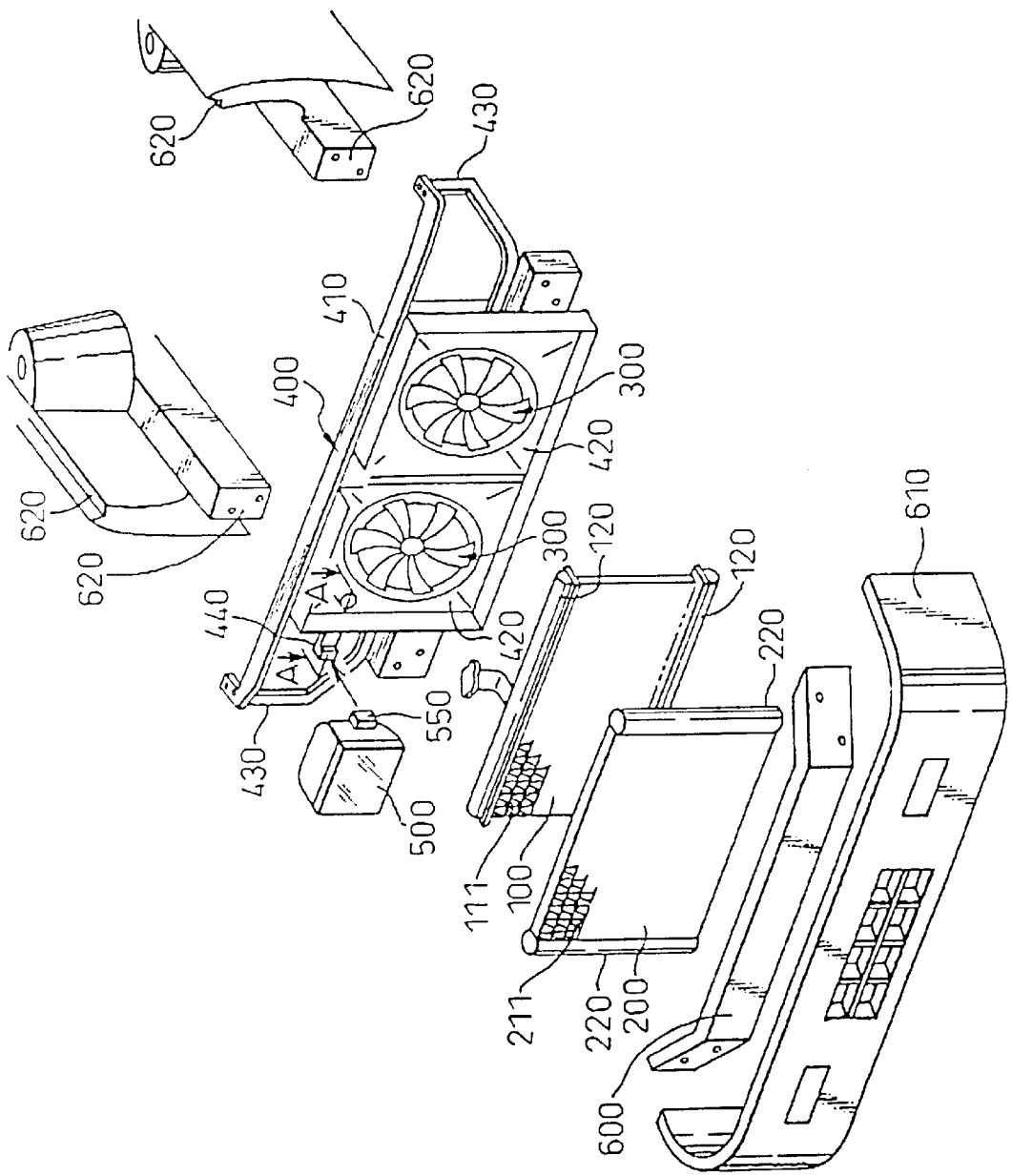
FIG. 1 is an exploded perspective view showing the front end portion of a vehicle having a front end structure and a headlamp system according to a first embodiment of the invention.

FIG. 1 is an exploded perspective view showing the front end portion of a vehicle having a front end structure and a headlamp system according to a first embodiment of the invention. Reference numeral 100 designates a radiator, numeral 200 a condenser, and numeral 300 a blower for blowing the cooling air to the radiator 100 and the condenser 200.

The radiator 100 is a well-known heat exchanger of a multi-flow type including a radiator core 110 having a plurality of radiator tubes 111 allowing the cooling water of the internal combustion engine to flow therethrough and radiator tanks 120 arranged on the longitudinal ends of the radiator tubes 111 and communicating with each radiator tube 111. The condenser 200, like the radiator 100, is a well-known heat exchanger of a multi-flow type including a condenser core 210 having a plurality of condenser tubes 211 allowing the refrigerant to flow therethrough and condenser tanks 220 arranged on the longitudinal ends of the condenser tubes 211 and communicating with each condenser tube 211.

Numeral 400 designates a front end panel (hereinafter referred to as the panel) made of resin (a glass fiber-reinforced polypropylene in this embodiment) on which the vehicle front end parts such as the radiator 100, the condenser 200 and the blower 300 are fixedly assembled. The panel 400 includes, integrally formed, a horizontally extending upper beam 410 located on the upper side of the panel 400, a shroud 420 for supporting (the electric motors of) the blowers 300 and preventing each blower 300 from sucking air from downstream side of the radiator 100 in the air flow, and light stays (light mounts) 430 on each of which a headlamp 500 for radiating light ahead of the vehicle is assembled.

Although the left headlamp 500 is not shown in FIG. 1, a head lamp headlamp 500 is assembled on each of the left and right sides of the vehicle, and a hood lock (not shown) for fixing the bonnet (engine hood) is assembled on the upper beam 410.

Figure 2:
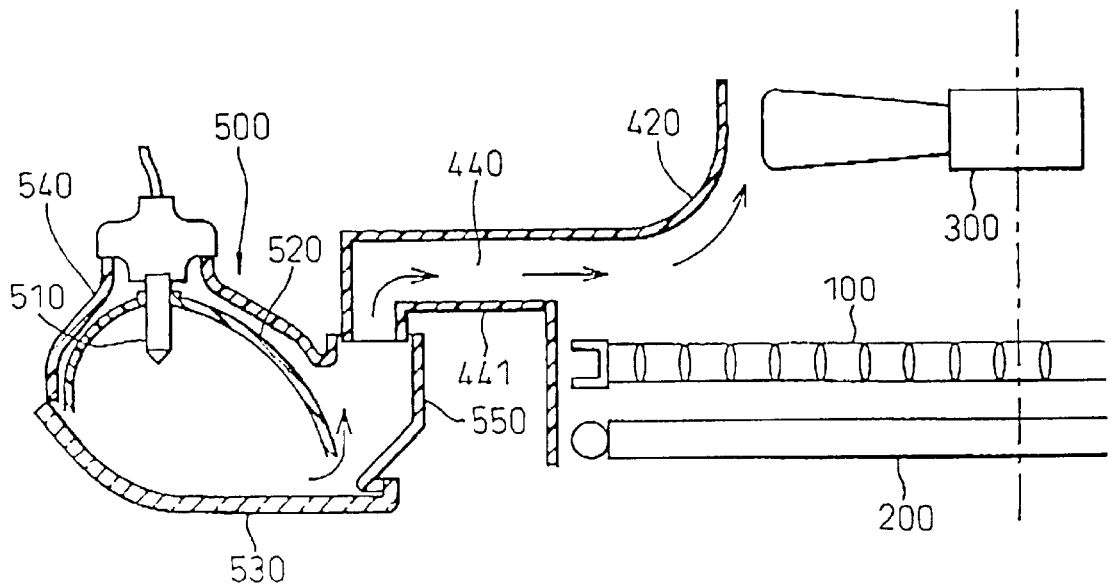
FIG. 2 is a sectional view taken in line A—A in FIG. 1.

The headlamp 500 includes, as shown in FIG. 2, a bulb 510 making up a light source, a concave reflector 520, a lens 530 for condensing the direct light from the bulb 510 and the light reflected from the reflector 520, and a light housing 540 for covering the bulb 510 and the reflector 520 from behind the reflector 520.

The panel 400 has a vent line 440 for establishing communication between the interior of the headlamp 500 and the blower 300. The duct member 441 making up the vent line 440 is formed integrally with the panel 400.

The headlamp 500 (light housing 540) is formed integrally with a light duct member 550 connected to the duct member 441 for establishing communication between the interior of the headlamp 500 (light housing 540) and the interior of the vent line 440.

In FIG. 1, numeral 600 designates a bumper reinforcement (hereinafter referred to as the bumper) of a metal making up a buffer member on the vehicle front side, and numeral 610 a bumper cover made of resin. The bumper 600 and the panel 400 are secured to the body portions (side members) 620 on the side of the vehicle by fastening means such as bolts.

Now, the features of this embodiment will be explained.

The panel 400 has the vent line 440 for establishing communication between the interior of the headlamp 500 and the blower 300. Upon activation of the blower 300, therefore, the air in the headlamp 500 flows through the vent line 440 and is sucked into the blowers 300. At the same time, fresh air (atmospheric air) flows into the headlamp 500 from the gap between the bulb 510 and the reflector 520. Thus, the interior of the headlamp 500 is forcibly ventilated.

Thus, the absolute humidity in the headlamp 500 becomes substantially equal to that of the atmosphere, thereby making it possible to prevent the headlamp 500 from dimming.

Also, the interior of the headlamp 500 is ventilated by a simple means in which the existing blower 300, for blowing the cooling air to the radiator 100 and the condenser 200, is utilized in such a manner that the vent line 440 for establishing communication between the interior of the headlamp 500 and the blower 300 is arranged on the panel 400. For this reason, the headlamp 500 is prevented from dimming while suppressing an increase in the vehicle production cost.

The original function of the blower 300 is to blow the cooling air to the radiator 100 and the condenser 200. The blower 300 is activated, therefore, in the event that the temperature of the cooling water increases to higher than a predetermined level or the pressure in the condenser 200 reaches a predetermined value. According to this embodiment, however, the blower 300 is controlled to continue in operation for a predetermined length of time To following the turning off of the headlamp 500, and therefore the dimming of the headlamp 500 is prevented more positively.

A different length of the predetermined time To is appropriately selected for a different headlamp 500 and a different type of vehicle based on the time required before the internal temperature of the headlamp 500 (especially, the temperature in the neighborhood of the bulb 510 and the reflector 520) decreases to the same level as the atmospheric temperature.

In view of the fact that the duct member 441 making up the vent line 440 is formed integrally with the panel 400, the vent line 440 is assembled completely at the same time as the headlamp 500 is assembled on the panel 400.

As described above, according to this embodiment, the assembly of the headlamp 500 and the neighborhood thereof can be improved while at the same time preventing the dimming of the headlamp 500 and thus reducing the number of steps in assembling the vehicle.

According to this embodiment, the light duct member 550 is assembled by being inserted into the duct member 441 from the front side of the vehicle in such a manner that the light duct member 550 is located outside of the duct member 441. In this way, rain water is shut out, which otherwise might intrude into the headlamp 500 by way of the connecting portion between the light duct member 550 and the duct member 441, while the vehicle is running.

Second Embodiment

Figure 3:
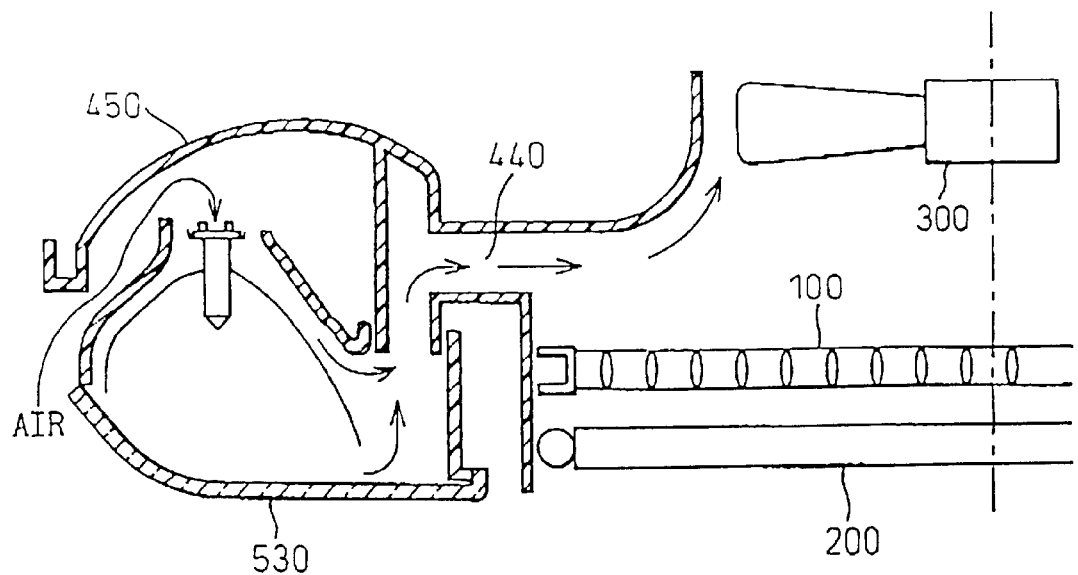
FIG. 3 is a sectional view of a front end panel structure according to a second embodiment of the invention corresponding to the sectional view taken in line A—A in FIG. 1.

This embodiment further comprises a blocking member 450 made of resin for preventing the air (hot air) that has passed through the radiator 100 and the condenser 200 from flowing into the headlamp 500, which blocking member 450 is arranged on the side of the headlamp 500 nearer to the radiator 100 and the condenser 200 (the rear side of the headlamp 500), as shown in FIG. 3. The blocking member 450 has the additional function to block the heat which otherwise might be transmitted from within the engine compartment into the headlamp 500.

As a result, the air heated while passing through the radiator 100 and the condenser 200 is prevented from flowing into the headlamp 500, and thus the atmospheric air (fresh air) can be allowed into the headlamp 200. The interior of the headlamp 500 can thus be cooled to the atmospheric temperature rapidly, and the headlamp 500 can be more positively prevented from dimming.

Third Embodiment

In the embodiments described above, the light duct member 550 is assembled by being inserted into the duct member 441 in such a manner as to be located outside of the duct member 441. The present invention, however, is not confined to such a configuration, but the light duct member 550 may alternatively be assembled by being inserted into the duct member 441 in such position as to be located inside of the duct member 441.

Figure 4:
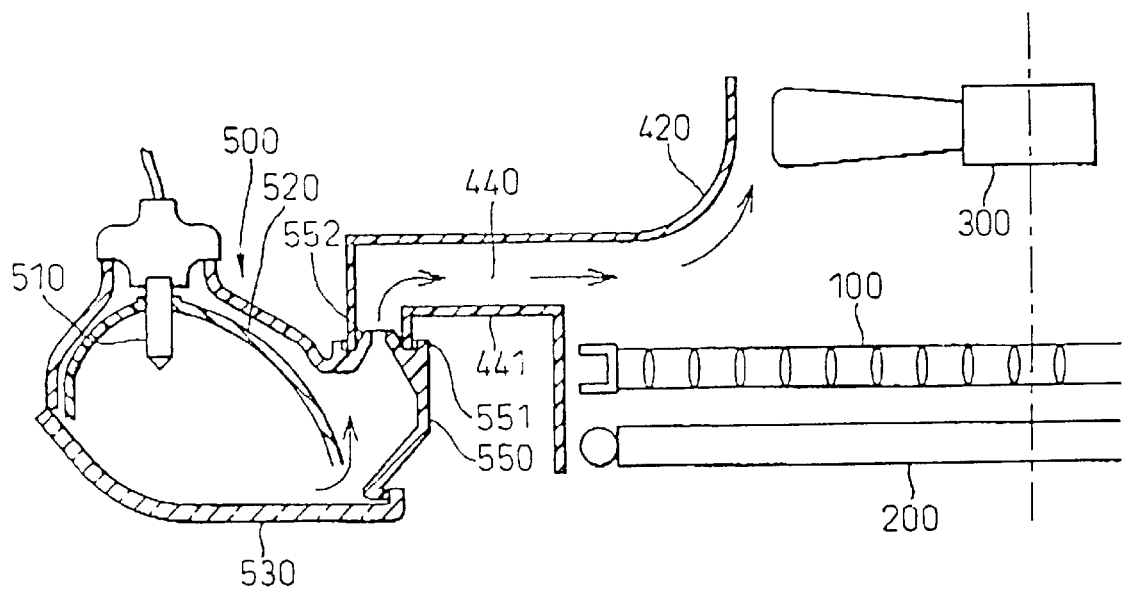
FIG. 4 is a sectional view showing the manner in which a light duct member and a duct member are connected to each other according to a third embodiment of the invention.

In this case, as shown in FIG. 4, the light duct member 550 is desirably provided with a cover portion 551 for covering the exterior of the connecting portion of the light duct member 550 and the duct member 441 to prevent rain water from intruding into the headlamp 500. At the same time, that portion of the light duct member 550 which is located inside of the duct member 441 is formed with a tapered portion 552 having a progressively decreased sectional area toward the forward end thereof to improve the assembly by insertion.

Also, instead of assembling the light duct member 550 and the duct member 441 by simple insertion as described above, engaging means with a hook may be used to prevent the light duct member 550 and the duct member 441 from separating from each other.

Fourth embodiment

Figure 5:
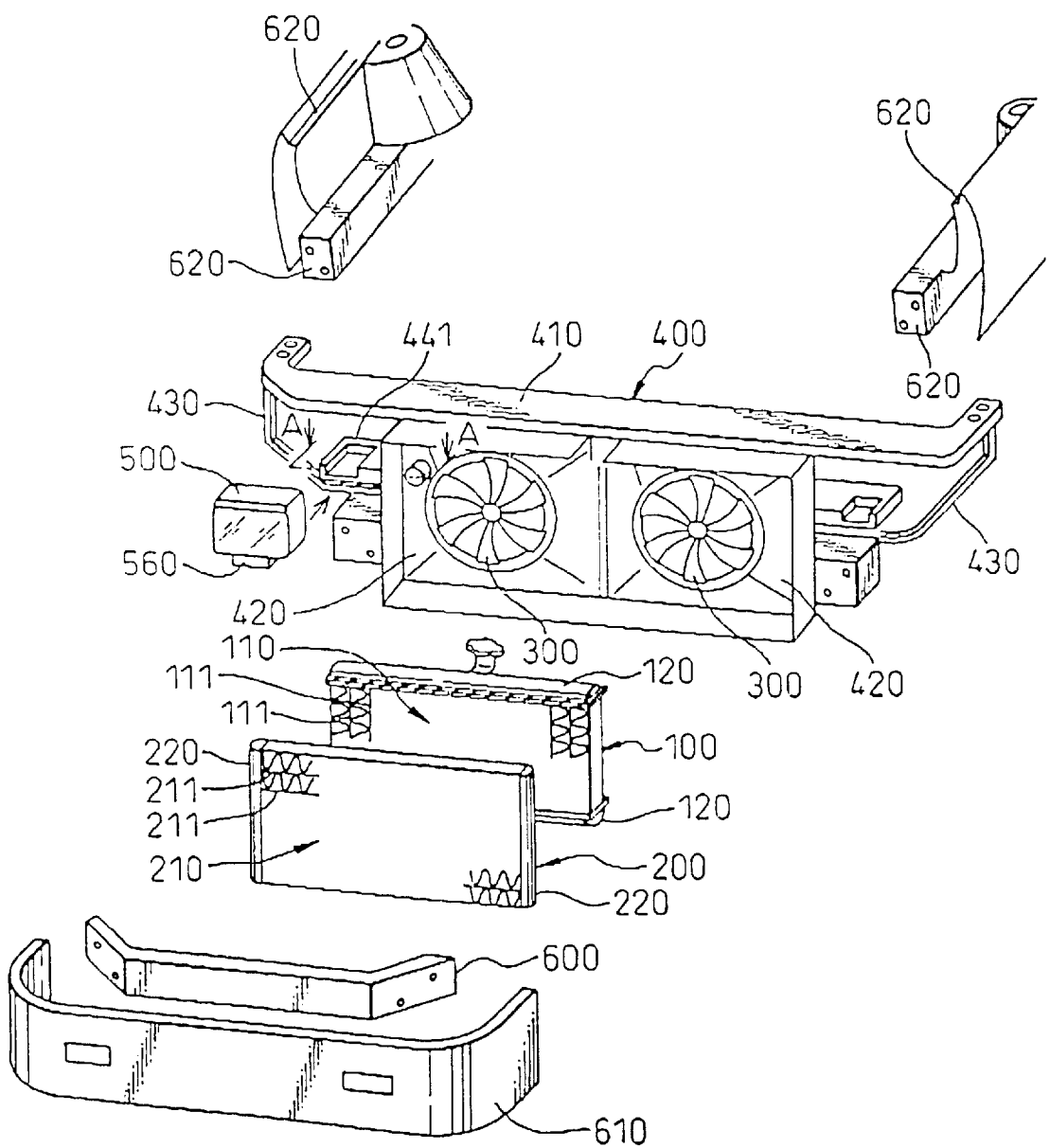
FIG. 5 is an exploded perspective view showing the front end portion of a vehicle having a front end structure and a headlamp system according to a fourth embodiment of the invention.
Figure 6A:
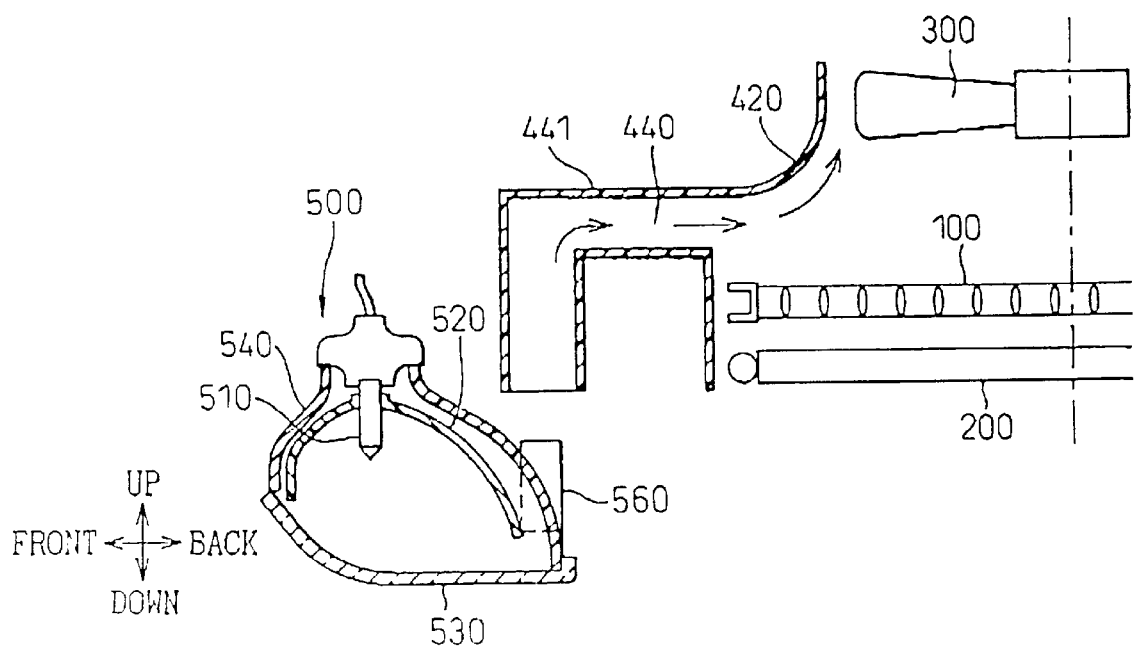
FIG. 6A is a sectional view taken in line A—A in FIG. 5, and FIG. 6B an enlarged perspective view showing the headlamp portion in FIG. 5.

FIG. 5 is an exploded perspective view showing the front end portion of the vehicle having the front end panel structure and the headlamp system according to a fourth embodiment of the invention. The basic portions of the structure except for the headlamp 500 are similar to those of the first embodiment and therefore will not be described. FIG. 6A is a sectional view taken in line A—A in FIG. 5, and FIG. 6B is an enlarged perspective view showing the headlamp portion in FIG. 5.

According to this embodiment, as shown in FIG. 6A, the headlamp 500 includes a high intensity discharge lamp bulb (hereinafter referred to as the bulb) 510 of a high-brightness type making up a light source, a concave reflector 520, a lens 530 for condensing the direct light from the bulb 510 and the light reflected from the reflector 520, a light housing 540 for covering the bulb 510 and the reflector 520 from the rear side of the reflector 520 and a light controller (ballast) 560 for controlling the bulb 510 (headlamp 500).

A duct member 441 making up a vent line 440 leading from the headlamp 500 (front side of the vehicle) to the blower 300 is connected to the shroud 420 of the panel 400 in such a manner as to make a detour around the radiator 100 and the condenser 20. According to this embodiment, the duct member 441 and the panel 400 are integrally formed of resin.

Figure 6B:
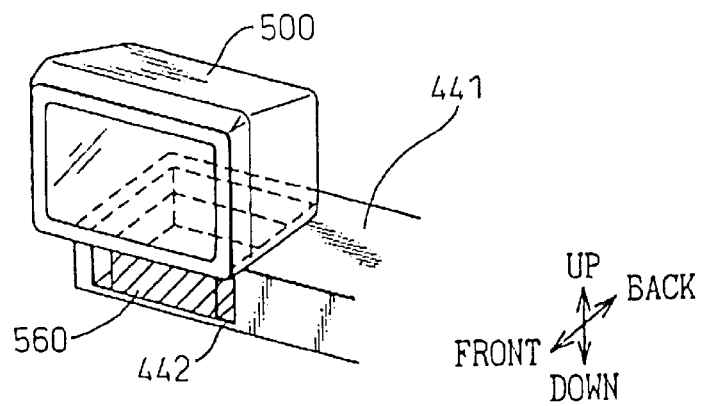

On the other hand, the headlamp 500, as shown in FIG. 6B, is such that the light controller (headlamp control means) 560 is securely assembled on the panel 400 (light stay 430) at an air inlet 442 of the duct member 441 (vent line 440).

This embodiment includes the duct member 441 making up the vent line 440 leading from the headlamp 500 to the blower 300. At the same time, the light controller 560 is fixedly assembled on the panel 400 at the air inlet 442 of the duct member 441 (vent line 440). Once the blower 300 is activated, therefore, the light controller 560 can be forcibly cooled directly by the air introduced into the vent line 440.

It is thus possible to cool the light controller 560 sufficiently. Therefore, electric parts such as an IC chip and a base board low in heat resistance can be employed for the light controller 560 while at the same time making it possible to reduce the size of the light controller 560.

In addition, both the production cost and the size of the light controller 560 can be reduced at the same time. Thus, the workability is improved for mounting the headlamp 500 (headlamp system) on the vehicle.

As is apparent from the foregoing description of the features of the invention, the blower 300 is required to be activated when forcibly cooling the light controller 60 by air. While the vehicle is running, however, the light controller 560 can be forcibly cooled by the atmospheric air flow. When the vehicle is stationary, on the other hand, the light controller 560 cannot be forcibly cooled by the atmospheric air flow.

The blower 300, which has the original function of blowing the cooling air to the radiator 100 and the condenser 200, is adapted to be activated in the case where the temperature of the cooling water increases to a predetermined level or higher or in the case where the pressure in the condenser reaches a predetermined value.

According to this embodiment, however, the blower 300 is activated not only in the above-mentioned cases but also when the vehicle speed decreases below a predetermined value with the headlamp 500 on. In this way, the light controller 560 is forcibly cooled by air in stable fashion.

Also, in view of the fact that the duct member 441 making up the vent line 440 is formed integrally with the panel 400, the structure for forcibly cooling the light controller 560 by air is completed at the same time that the headlamp 500 is assembled on the panel 400.

As a result, the number of steps for assembling the vehicle can be decreased while reducing both the production cost and the size of the light controller 560 at the same time.

Fifth Embodiment

Figure 7:
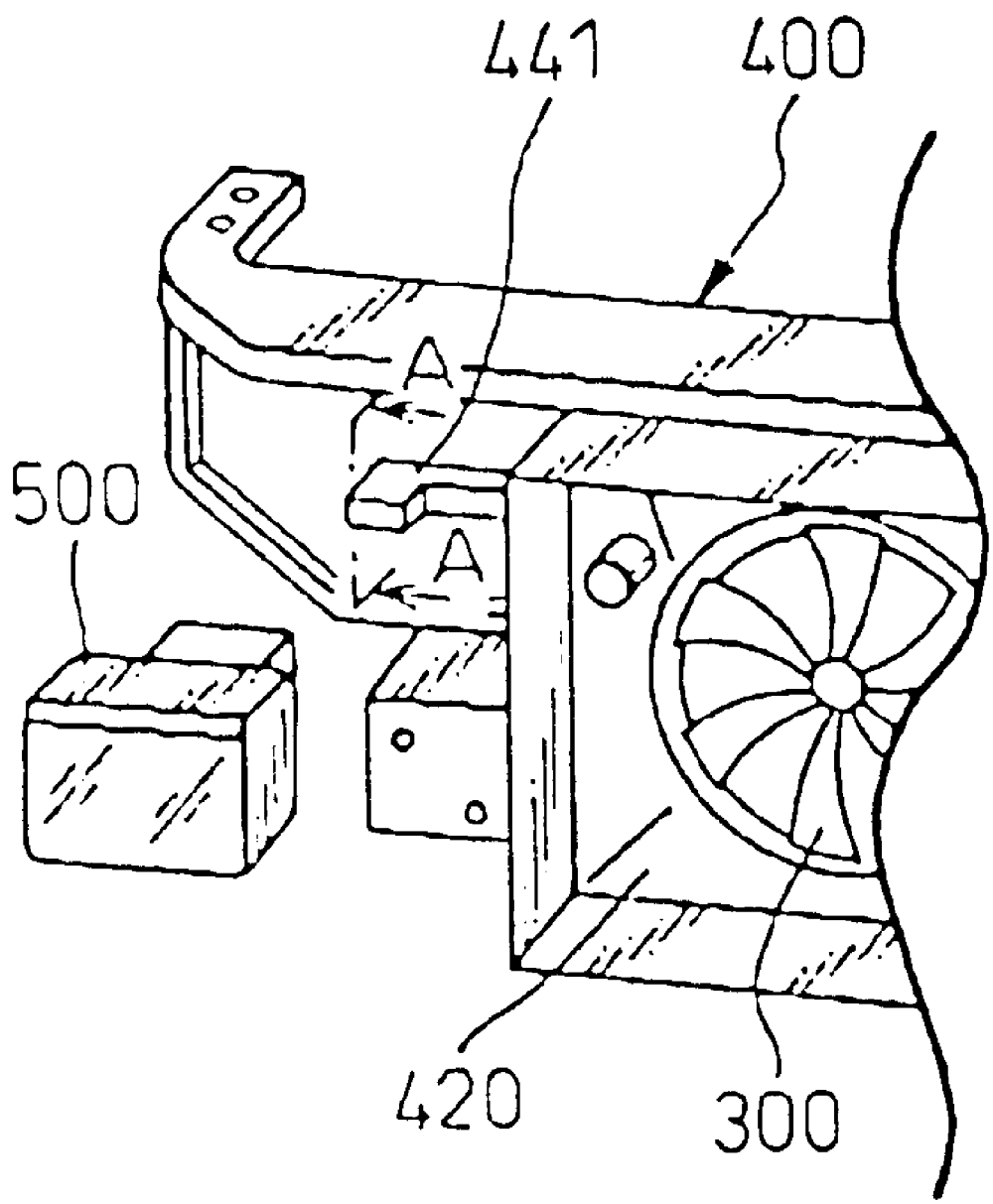
FIG. 7 is an exploded perspective view showing the front end portion of a vehicle having a front end structure and a headlamp system according to a fifth embodiment of the invention.

Unlike the fourth embodiment wherein the light controller 560 is arranged outside of the light housing 540 (FIG. 6B), the fifth embodiment refers to the case in which the light controller 560 is arranged within the light housing 540 as shown in FIGS. 7 and 8.

Specifically, as shown in FIG. 8, the duct member 441 is connected to the light housing 540 so that communication is established between the vent line 440 and the light housing 540.

As a result, the light controller 560, though arranged in the light housing 540, can be forcibly cooled by air directly.

According to this embodiment, the light controller 560 is arranged within the light housing 540, and therefore it is more difficult to cool the light controller 560 forcibly by the atmospheric air flow than in the fourth embodiment.

In this embodiment, therefore, the blower 300 is desirably activated whenever the temperature of the light controller 560 increases to a predetermined level or higher regardless of the running condition of the vehicle.

Sixth Embodiment

This embodiment, like the second embodiment, refers to the case in which the light controller 560 is arranged inside of the light housing 540.

Specifically, as shown in FIG. 9, the air inlet 442 of the duct member 441 is opened to the neighborhood of the headlamp 500 (light housing 540) to forcibly cool the whole of the light housing 540 (headlamp 500) by air.

As a result, the light controller 560, in spite of being arranged in the light housing 540, can be forcibly cooled by air indirectly.

Other Embodiments

In the embodiments described above, the duct member 441 making up the vent line 440 is formed integrally with the panel 400. The present invention, however, is not limited to such a configuration, but the duct member 441 can be formed as a member independent of the panel 400 and coupled with the panel 400. Similarly, the light duct member 550 can of course be connected to the light housing 540 after being formed as a member independent of the light housing 540.

Also, unlike in the embodiments described above wherein the panel 400 is made of resin, the panel 400 can be formed of a metal or the like material other than resin.

Further, instead of arranging the blower 300 downstream of the radiator 100 and the condenser 200 in the air flow as in the aforementioned embodiments, the blower 300 may be arranged upstream of the radiator 100 and the condenser 200 in the air flow. In the latter case, the air flows in the vent line not by being sucked into the blower 300 but by being pushed by the air blown out of the blower 300.

Furthermore, the present invention, which has been described above with reference to the headlamp 500, is not limited to a headlamp 500 but applicable a fog lamp, a small lamp or other lamps with equal effect. In similar fashion, the bulb 510 is not limited to a discharge bulb.

In addition, unlike in the embodiments described above referring to an automotive vehicle equipped with the condenser 200 for the air conditioner, the present invention is applicable also to an automotive vehicle equipped only with the radiator 100 but not with the condenser 200 or the like heat exchanger for the air conditioner, as well.

What is claimed is:

1. A front end structure of an automotive vehicle, comprising:

headlamps for radiating light ahead of the vehicle;

heat exchangers arranged on the forward end of the vehicle;

a blower for blowing cooling air to the headlamps and the heat exchangers; and a front end panel arranged at the front end portion of the vehicle and having assembled thereon the headlamps, the heat exchangers and the blower;

wherein the front end panel is formed with a vent line for establishing communication between an interior of each of the headlamps and the blower the vent line defining a path which detours around the heat exchangers, and wherein a duct member constituting the vent line is formed integrally with the front end panel.

2. A front end structure according to claim 1, wherein said duct member and said front panel are formed of resin integrally with each other.

3. A front end structure according to claim 1, further comprising a blocking member arranged on the side of each headlamp nearer to the heat exchangers for preventing the air that has passed through the heat exchangers from flowing into the headlamp.

4. A front end structure according to claim 1, wherein said front end panel is arranged in front of an engine compartment, and a blocking member for blocking the heat transmission from the interior of said engine compartment to the interior of each of said headlamps is arranged behind said headlamp.

5. A front end structure according to claim 1, further comprising a blocking member for introducing the atmospheric air into said headlamps.

6. A front end structure of an automotive vehicle according to claim 1, further comprising a shroud for covering a gap between said blower and said heat exchangers, said vent line being connected to said shroud.

7. A front end structure of an automotive vehicle according to claim 1, further comprising headlamp control means arranged in said vent line for controlling the illumination of said headlamps.

8. A front end structure according to claim 1, wherein said blower is activated following the turning off of said headlamps.

9. A headlamp system used with an automotive vehicle having heat exchangers for cooling a cooling fluid and a blower for blowing air, said headlamp system comprising:

headlamps for radiating light ahead of said vehicle; and headlamp control means for controlling said head lamps; wherein said blower blows said air to said heat exchangers, said headlamps and said headlamp control means;

said headlamp control means is forcibly cooled by the air blown from said blower, the air blown from the blower which cools the headlamp control means flowing in a path which detours around the heat exchangers; and said blower is activated in the case where the vehicle speed decreases to below a predetermined value with said headlamps on.

10. A front end structure according to claim 1, wherein said blower is activated in the case where the vehicle speed decreases to below a predetermined value with said headlamps on.

11. A front end structure according to claim 1, wherein an opening for introducing atmospheric air into an interior of the headlamp is provided at the headlamp.

12. A front end structure according to claim 11, wherein said headlamp comprises a bulb making up a light source and a reflector for reflecting direct light from the bulb, the opening for introducing the atmospheric air is located behind the reflector.

13. A front end structure according to claim 1 wherein the duct member is located at an upstream side of the blower, and air sucked by the blower from outside of the vehicle flows through the duct member.

14. A front end structure according to claim 1 wherein an opening for introducing the atmospheric air to an interior of each of light housings is formed at each of the light housings for accommodating the headlamps.

15. A front end structure according to claim 14 wherein an entire area of the openings of the light housings is smaller than that of an airflow area of the heat exchanger.

16. A front end structure according to claim 6 wherein the duct member connects to the shroud at a downstream side of the heat exchangers.

17. A front end structure according to claim 9 wherein a duct member for establishing communication between a light housing for accommodating the headlamp and the blower is provided as vent line for directing the air to forcibly cool the headlamp control means.

* * * * *